United States Patent Office 3,431,279
Patented Mar. 4, 1969

3,431,279
CYCLIC ESTERS OF o-PHTHALIC ACID
AND A GLYCOL ETHER
Wendell A. Ehrhart, Hellam, Pa., assignor to Armstrong
Cork Company, Lancaster, Pa., a corporation of
Pennsylvania
No Drawing. Filed Mar. 1, 1966, Ser. No. 530,787
U.S. Cl. 260—340.2     5 Claims
Int. Cl. C07d 19/00; C08f 45/42

ABSTRACT OF THE DISCLOSURE

A new class of macrocyclic diesters of o-phthalic acid or its anhydride and a glycol ether. The compounds are represented by the structural formula:

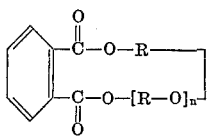

---

This invention relates to a new class of chemical compounds and, more particularly, a new class of macrocyclic diesters of o-phthalic acid or its anhydride and a glycol ether.

The new compounds of this invention are represented by the following structural formula:

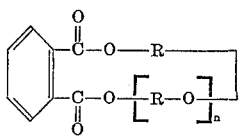

In the formula $n$ represents an integer of from 1 to 3 and each R independently represents a lower alkylene radical containing from 2 to about 4 carbon atoms. Thus R may be ethylene, 1,2-propylene, 1,3-propylene, 1,3-butylene, and 1,4-butylene. In the formula each R may be either identical to one another or may be different.

The reaction by which the macrocyclic esters of this invention are prepared is illustrated by the following equation:

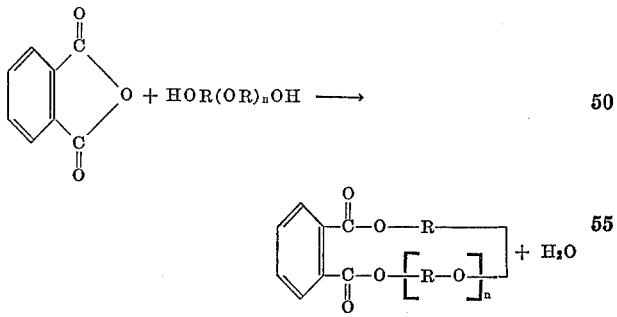

Illustrative of glycol ethers which may be reacted with phthalic acid or its anhydride to form the macrocyclic esters of this invention are diethylene glycol, dipropylene glycol (mixed or individual isomers), triethylene glycol, 2-(2-hydroxypropoxy) ethanol, tripropylene glycol (mixed or individual isomers), bis-(3-hydroxypropyl) ether, 2-(3-hydroxypropoxy) ethanol, tetraethylene glycol, bis-(4-hydroxybutyl) ether, and 1,3-bis-(2-hydroxyethoxy) butane.

The macrocyclic esters may be prepared by first forming a predominately hydroxy terminated, low acid number polyester by heating together phthalic anhydride, a glycol ether, and a catalyst while purging with an inert gas. A small amount of cyclic ester is also initially formed.

The polyester is then depolymerized at a temperature of about 190–290° C. under a vacuum of from about 0–20 mm. Hg. During the depolymerization the cyclic ester originally formed and that formed on depolymerization is continuously removed from the reaction vessel.

The invention will be more fully illustrated by the following examples:

EXAMPLE 1

To a 3-liter, 5-necked flask was charged 1110 g. (7.5 moles) of phthalic anhydride, 945 g. (9.0 moles) of diethylene glycol, and 4.0 g. of tetrabutyl-o-titanate. The flask was equipped with a heating mantle, mechanical stirrer, thermometer, gas inlet tube and a vacuum jacketed fractionating column (L=47 cm., I.D.=1.5 cm.) filled with glass helices. Carbon dioxide was bubbled through the mixture at a rate of 1.8 liters/min. A still head with thermometer and take-off condenser surmounted the fractionating column. The stirrer and heating mantle were turned on and the temperature was raised to 220° C. over a period of one hour and 15 minutes. When the temperature reached approximately 180° C., water began to collect in a vented receiver beyond the take-off condenser. During this reaction the temperature of the exit gases at the top of the fractionating column never went above about 100° C. After 2¾ hours at 220° C., a sample was taken for an acid number determination [A.N.=1.5 (mg. KOH/g. sample)]. After three hours at 220° C., the flow of carbon dioxide was stopped and the fractionating column was replaced by a still head and air condenser leading to a receiver in an ice water bath. The top of the flask and the still head were then insulated with asbestos cloth and the system was evacuated through a port in the receiver to approximately 1 mm. Hg and heated to 230° C. with stirring. The temperature of the distilling vapors rose gradually to a fluctuating 170°–180° C. The distillation was continued until the flask was nearly empty (6½ hours). The crude semicrystalline distillate (1,768 g.) was warmed until the crystals melted and then poured slowly into 2,500 ml. of water with vigorous agitation. The resulting slurry was brought to a pH of 9–10 by adding sodium carbonate. After stirring for 15 minutes, the solid was collected by filtration, washed well with distilled water and dried to give 1,570 g. (88.7% of theoretical) of a white powder (M.P. 61°–62° C.). A portion was recrystallized four times from methanol/water, ether/petroleum ether, ether/petroleum ether and menthanol, respectively. This procedure raised the melting point to 61.8°–63.2° C. The nuclear magnetic resonance spectrum and the data given below show the compound to be 1,3,4,6,7,9 - hexahydro - 2,5,8 - benzotrioxacycloundecin-1,9-dione of the formula:

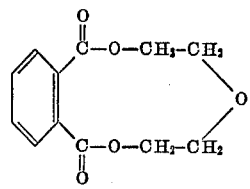

Infrared spectrum: indicates a phthalate ester, no hydroxyl, no carboxyl. Calculated for C, 61.01; H, 5.12. Found: C, 60.83; H, 5.06. Molecular weight: Theoretical 236, found 232. Saponification equivalent: Theoretical 118, found 121. Isolated upon saponification: Phthalic acid, diethylene glycol.

EXAMPLE 2

Using essentially the same equipment and procedure set forth in Example 1, 6.5 moles of phthalic anhydride was reacted with 8.0 moles of triethylene glycol in the presence of 6.0 grams of stannous oxalate. In this case the vacuum distillation was carried out at 260° C. rather than 230° C. The distillate collected was melted and poured into 5 liters of agitated ice water in a Waring Blender. The mixture was agitated vigorously and 70 g. of sodium carbonate was added. After further agitation (5 min.), the pH of this suspension was found to be about 9–10. The resulting insoluble solid was collected by suction filtration, washed with 2 liters of 5% aqueous sodium carbonate and with five liters of water and dried to give 1,398 g. of a pale brown solid (M.P. 110–117° C.). Recrystallization from methanol gave 1,202 g. (66.0% of theoretical) of white crystals (M.P. 115.8–117.8° C.). Three additional recrystallizations of a portion of this from benzene/mineral spirits (50/50), methanol/water (60/40) and benzene/mineral spirits (50/50) raised the melting point to 118.5–120° C. The nuclear magnetic resonance spectrum and the data given below show this compound to be 1,3,4,6,7,9,10,12-octahydro-2,5,8,11-benzotetraoxacyclotetradecin-1,12-dione. The structure is illustrated below.

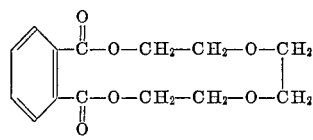

Infrared spectrum: Indicates a phthalate ester, no hydroxyl, no carboxyl. Calculated for C, 59.99; H, 5.76. Found: C, 59.78; H, 5.58. Molecular weight: Theoretical 280, found 275. Saponification equivalent: Theoretical 140, found 143. Isolated upon saponification: Phthalic acid, triethylene glycol.

EXAMPLE 3

To an apparatus, such as is described in Example 1, was charged 1,080 g. (7.3 moles) of phthalic anhydride, 1,205 g. (9.0 moles) of commercial dipropylene glycol[1] and 6.0 g. of $SnC_2O_4$. Carbon dioxide was introduced at a rate of 1.8 liters/min. and the mixture was heated with stirring to 225° C. over a period of about 1⅓ hours. When the temperature reached about 190° C., water began to distill. Four and three quarter hours after the first water began to distill, a sample was taken and the acid number of the polyester was found to be 3.49. At 5¾ hours, the heating was stopped and the mixture was allowed to cool under carbon dioxide. The mixture was reheated and when the temperature reached 183° C., the fractionating column was replaced by a still head, condenser and receiver (cooled in an ice bath) and the system was insulated and evacuated to approximately 1 mm. The temperature was then raised to 235° C. over a period of 30 minutes. After a total of three hours and 45 minutes of vacuum distillation, the reaction was stopped (phthalic anhydride crystals had begun to clog the air condenser). The light orange distillate weighed 577 g. and was partially crystalline. This was completely melted and poured into a mixture of two liters of 5% aq. $Na_2Co_3$ and 800 g. of ice in a Waring Blender. After thorough agitation, a viscous oil separated and the aqueous portion (pH=9–10) was decanted. The residual viscous oil was then washed with two 2,800 g. portions of ice water with agitation in the blender and decanting. Between the first and second washings, the oil partially crystallized. The residual sludge was dissolved in 500 ml. of $CHCl_3$ and the small aqueous layer which separated was discarded. The $CHCl_3$ solution was then distilled under vacuum and the fraction boiling at 130–135° C./0.15 mm. was collected. This fraction weighed 289 g. (15% of theoretical)

[1] Commercial dipropylene glycol consists of a mixture of three positional isomers, namely 2,2'-oxydi-1-propanol (diprimary alcohol), 2-(2-hydroxy-propoxy)-1-propanol (primary-secondary alcohol) and 1,1'-oxydi-2-propanol (disecondary alcohol). Since each of these positional isomers have two asymmetric carbon atoms, it can be assumed that each of these is a mixture of 2-diasterioisomers (a and b). Thus, the commercial glycol is a mixture of 6-isomeric glycols (optical isomers excluded) which should give rise to a mixture of 6-isomeric cyclic esters.

and became predominately crystalline upon cooling. The analytical data given below show the product to be a mixture of the isomeric o-phthalate cyclic esters of dipropylene glycol. This was confirmed via gas chromatography of the product (has been resolved into 5 overlapping peaks and shoulders using extra long columns) and of the glycol fraction obtained upon saponification. (This glycol can be resolved into four peaks with retention times identical to those of the four peaks similarly obtainable from commercial dipropylene glycol.) In addition, the two pure cyclic ester diasterioisomers derived from 2-(2-hydroxypropoxy)-1-propanol have been isolated from this mixture. These were isolated as follows: a portion of the above product was triturated with dipropylene glycol and the undissolved crystals were collected by filtration and washed with dipropylene glycol, then water. The dried crystals were then recrystallized from 3/2 petroleum ether/benzene to give Fraction A. The solvent was then removed from the mother liquor and the resulting semicrystalline mass was triturated with petroleum ether, the crystals (Fraction B) collected via filtration and washed with ether and petroleum ether. Upon further recrystallization, Fraction A gave a pure diasterioisomer (A) of the cyclic phthalate ester derived from 2-(2-hydroxypropoxy)-1-propanol, and Fraction B gave sharply melting crystals which were shown to be a mixture (solid solution or molecular complex) of A and another isomer (B) via preparative gas chromatography and via elution from a column of neutral alumina with 80/20 benzene/hexane. Pure B melts at 105.8–107.1° C. The structures of A and B have been elucidated via Nuclear Magnetic Resonance Spectroscopy as follows:

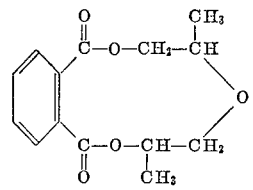

Macrocyclic phthalate ester of 2-(2-hydroxypropoxy)-1-propanol (A), M.P. 130.5–131.5° C. Infrared spectrum: Indicates a phthalate ester, no hydroxyl, no carboxyl. Calculated for C, 63.62; H, 6.10. Found: C, 63.56; H, 6.04. Molecular weight: Theoretical 264, found 270. Saponification equivalent: Theoretical 132, found 132.5. Isolated upon saponification: Phthalic acid, 2-(2-hydroxypropoxy)-1-propanol (a).

Macrocyclic phthalate ester of 2-(2-hydroxypropoxy)-1-propanol (B), M.P. 105.8–107.1° C. Infrared spectrum: Indicates a phthalate ester, no hydroxyl, no carboxyl. Calculated for C, 63.62; H, 6.10. Found: C, 63.92; H, 6.12. Molecular weight: Theoretical 264, found 254. Saponification equivalent: Theoretical 132, found 130. Isolated upon saponification: Phthalic acid, 2-(2 - hydroxypropoxy)-1-propanol (b).

The compounds of this invention are useful as plasticizers and process aids for polyvinyl chloride resin formulations. The following examples are illustrative of such utility.

EXAMPLE 4

The following formulations were dry blended in a Henschel Mixer and portions of the blends subsequently extruded at 190° C. through a tungsten carbide capillary (L/D=1.00/0.05) using an Instron Capillary Melt Theometer. The remaining dry blend was processed into 70 mill sheets via mixing and sheeting on a steam heated two roll mill and pressing in a flat bed press at 340° F.

| Formulation | A | B | C |
|---|---|---|---|
| Diamond PVC-40 [1] | 100 | 100 | 100 |
| Thermolite-31 [2] | 4 | 4 | 4 |
| Stearic Acid | 1 | 1 | 1 |
| Dioctyl Phthalate | | 15 | |
| Cyclic diethylene glycol phthalate from example No. 1 | | | 15 |

[1] A medium mol. wt. vinyl chloride homopolymer.
[2] An organo tin mercaptide heat stabilizer (Metal and Thermit Corp.).

Whereas formulation A was very difficult to process on the two roll mill, formulations B and C could be processed easily. More quantitative data was provided by the Capillary Melt Rheometer (see table below).

| Shear rate (sec.$^{-1}$) | 1.47 | 7.36 | 29.4 | 147.2 |
|---|---|---|---|---|
| Viscosity (poises) formulation A | 568,000 | 213,000 | 90,400 | 30,900 |
| Viscosity (poises) formulation B | 213,000 | 84,900 | 39,400 | 15,200 |
| Viscosity (poises) formulation C | 179,000 | 74,600 | 37,900 | 15,800 |

The table below tabulates glass transition temperature (Tg), as determined by differential thermal analysis and some physical properties of formulations A, B and C.

| Formulation | A | B | C |
|---|---|---|---|
| Tg, (° C.) | 67.5 | 32 | 44 |
| 1% modulus (p.s.i.) [1] | 1,750 | 1,167 | 1,600 |
| Tensile strength (p.s.i.) [1] | 4,208 | 2,533 | 3,900 |
| Ultimate Elong. (percent) [1] | 4.5 | 224 | 2.9 |
| Olsen Stiffness (in.-lb.) [2] | 12.8 | 6.1 | 11.3 |

[1] Machine speed = 1"/min.
[2] Width = 2", span = 1", 10° bend.

The above data illustrates that cyclic diethylene glycol phthalate is an efficient high temperature plasticizer and processing aid and a relatively inefficient plasticizer at room temperature. This characteristic allows the fabrication of rigid PVC articles from vinyl formulations with good processing characteristics. Formulation C was clear and colorless, had good heat stability and has showed no signs of exudation or cloudiness upon aging.

EXAMPLE 5

The following filled flooring type polyvinyl chloride formulations were processed into 70 mill sheets via Banbury mixing, sheeting on a two roll mill and pressing at 340° F. in a flat bed press.

| | | Formulation [1] | | | |
|---|---|---|---|---|---|
| | Density | 1 | 2 | 3 | 4 |
| Escambia 1200 (a vinyl chloride homopol,mer) | 1.38 | 41.25 | 38.5 | 41.25 | 38.5 |
| Admix 710 (an epoxidized soybean oil) | 0.99 | 2.35 | 2.19 | 2.35 | 2.19 |
| Ferro A-5 (a BaCd stabilizer) | 1.21 | 1.40 | 1.31 | 1.40 | 1.31 |
| Limestone (50 mesh) | 2.71 | 39.0 | 39.0 | 39.0 | 39.0 |
| Titanium dioxide (rstile) | 4.2 | 1.0 | 1.0 | 1.0 | 1.0 |
| Cyclic diethylene glyco phthalate (from example No. 1) | 1.37 | 15.0 | 18.0 | | |
| Dioctyl phthalate | 0.99 | | | 15.0 | 18.0 |
| Olsen Stiffness (in. lb./20° bend) | | 5.2 | 1.8 | 2.4 | 1.2 |

[1] Amounts of ingredients are expressed in percent by volume. Relative weights may be obtained via multiplication by the respective densities.

The Olsen Stiffnesses of these samples indicate that cyclic diethylene glycol phthalate has the ability to flexibilize polyvinyl chloride at room temperature. Formulations 1 and 2 showed much less tendency to yellow under foot traffic than the control formulations (3 and 4) containing a conventional plasticizer.

EXAMPLE 6

The following polyvinyl chloride compositions were processed into sheets via mixing and sheeting on two roll mill and pressing at 340° F. in a flat bed press.

| Formulation | A | B |
|---|---|---|
| Escambia 1200 (A vinyl chloride homopolymer) | 100 | 100 |
| Thermolite 31 (An organotin mercaptide stabilizer) | 2 | 2 |
| Cyclic Triethylene Glycol Phthalate from Example No. 2 | | 20 |

Formulation A was barely processable at mill roll temperatures of 340° and 310° F., whereas Formulation B could be processed at mill roll temperatures as low as 290° and 250° F. The resulting pressed sheets were similar in appearance, both being practically clear and colorless. Both were hard and rigid at room temperature.

I claim:
1. A compound of the following formula:

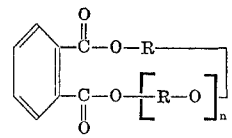

wherein $n$ is an integer from 1 to 3 and each R independently represents an alkylene radical containing from 2 to about 4 carbon atoms.

2. The compound of the formula:

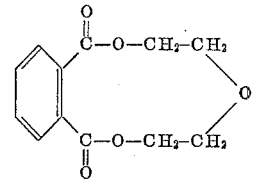

3. The compound of the formula:

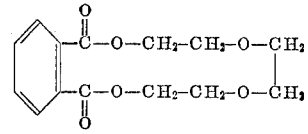

4. The compound of the formula:

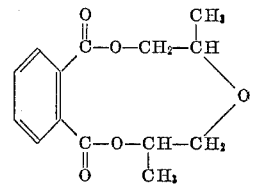

5. The compound of the formula:

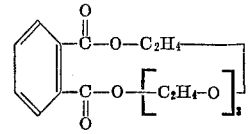

References Cited

UNITED STATES PATENTS 2,545,516   3/1951   Gessler.

OTHER REFERENCES

Encyclopedia of Chemical Technology, ed. by Kirk and Othmer, vol. 10 (1953), pp. 768–769, "Plasticizers."

Encyclopedia of Chemical Technology, ed. by Kirk and Othmer, vol. 7 (1951), pp. 250–256, "Glycols."

HENRY R. JILES, *Primary Examiner*.

S. WINTERS, *Assistant Examiner*.

U.S. Cl. X.R.

260—30.4